CONTINUOUSLY AND AUTOMATICALLY CLEANING MULTICELLULAR FILTERS

Original Filed April 15, 1965 5 Sheets-Sheet 1

CONTINUOUSLY AND AUTOMATICALLY CLEANING MULTICELLULAR FILTERS

Original Filed April 15, 1965 5 Sheets-Sheet 2

CONTINUOUSLY AND AUTOMATICALLY CLEANING MULTICELLULAR FILTERS

Original Filed April 15, 1965 5 Sheets-Sheet 5

United States Patent Office

Re. 27,163
Reissued Aug. 10, 1971

27,163

CONTINUOUSLY AND AUTOMATICALLY CLEANING MULTICELLULAR FILTERS

Jean-Jacques Asper, Geneva, Switzerland, assignor to Brasco S.A., Geneva, Switzerland Original No. 3,392,835, dated July 16, 1968, Ser. No. 448,386, Apr. 15, 1965. Application for reissue May 13, 1969, Ser. No. 830,901
Int. Cl. B01d *29/38*
U.S. Cl. 210—138 17 Claims

Matter enclosed in heavy brackets [ ] appears in the original patent but forms no part of this reissue specification; matter printed in italics indicates the additions made by reissue.

ABSTRACT OF THE DISCLOSURE

A multicellular filter for liquids comprising several circularly arranged filter cells each enclosing at least one filter element carried at one end by a tubular member communicating with a common outlet chamber. Gauged annular passages surrounding each tubular member connect each cell with a common admission chamber. For cleaning, the cells communicate cyclically with a common discharge chamber via discharge channels each equipped with a valve having a brief maximal opening stage for sudden reverse filtrate flow followed by a longer partial opening stage for direct flow of liquid from the admission chamber to the discharge chamber.

This invention relates to filtration.

According to the present invention there is provided a continuously and automatically cleaning multicellular mechanical filter for liquids under pressure comprising, sequentially, an exit chamber, and admission chamber and a plurality of filter cells distributed about a common axis, the exit chamber, which is common to all filter cells, communicating with each filter cell via at least one tubular holder member having secured to the end thereof a filter element, and the admission chamber, which is common to all filter cells, communicating with each filter cell via a gauged annular passage provided around each tabular holder member, and further comprising after said plurality of filter cells a discharge chamber communicating with each filter cell via a channel provided with a valve, and a mechanism for successively subjecting each valve to a three-stage working cycle consisting of a maximal opening stage of very short duration, a partial opening stage of longer duration and a closure stage lasting for the remainder of said cycle, the passage through each valve having a cross-section such that the pressure gradient through each filter element, during said maximal opening stage, is the reverse of the pressure gradient during said closure stage and such that said pressure gradient is nil during said partial opening stage.

The invention also contemplates operating the above filter in conjunction with a filtering adjuvant by the utilization of means for conveying liquid collection in the discharge chamber to a separator for separating the liquid into a first fraction containing the impurities and a second fraction containing the filtering adjuvant, and means for injecting said second fraction into the liquid to be filtered upstream of the admission chamber, said filtering adjuvant thereby describing a closed circuit along which it is constantly regenerated.

For a better understanding of the invention and to show how it may be carried into effect, the same will now be described by way of example with reference to the accompanying diagrammatic drawings, in which.

Figure 1:
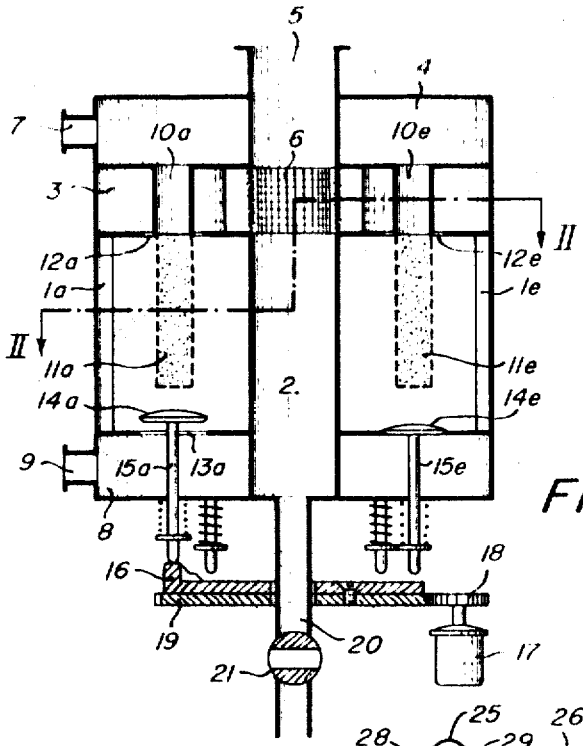
FIGURE 1 shows in vertical section a first embodiment of a filter according to the invention.
Figure 3:
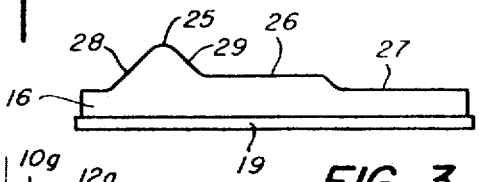
FIGURE 3 is a developed view of a component part of the filter shown in FIGURE 1.
Figure 2:
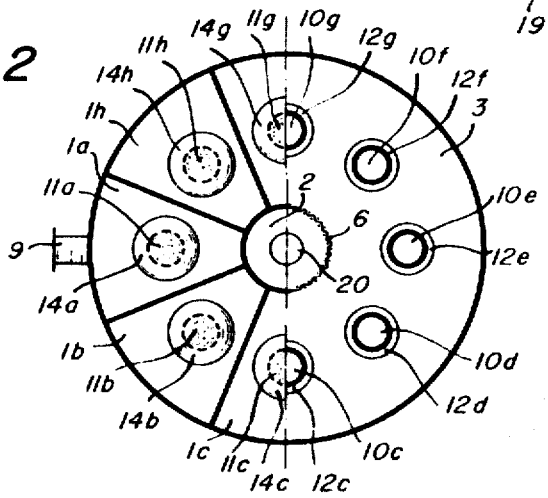
FIGURE 2 is a section taken on line II—II of FIGURE 1.

The filter shown in FIGURES 1 to 3 comprises a group of sector-shaped filter cells 1a to 1h radially arranged around a central tube 2 having an inlet 5. Above this group of cells are provided an admission chamber 3 and an exit chamber 4 which are superposed one above the other. Opposite the admission chamber 3, the central tube 2 defines a peripheral opening provided with a screen 6. The exit chamber 4 is provided with an outlet 7.

Below the group of cells 1a to 1h is provided a chamber 8 having an outlet 9. The top wall of each cell, e.g. 1a, is formed with at least one hole, e.g. 12a, to enable each cell to communicate with the admission chamber 3. The holes 12a to 12h are partly occupied by tubular members 10a to 10h acting as holders for porous filter elements 11a to 11h depending into the associated cells, so that communication between the admission chamber 3 and the cells is effected only through the annular passages that are left free around the tubular holder members.

At the bottom of the cells are fromed openings 13a to 13h normally closed by valves 14a to 14h. These openings each act as a channel and establish, when the valves are open, communication between the cells and the chamber 8. Valves 14a to 14h are controlled by push-rods 15a to 15h actuated by a rotary axially acting cam 16. This cam 16, which is driven by a motor 17 through the intermediary of a pinion 18 and of a crown wheel 19, is contoured to actuate push-rods 15a to 15h successively, thereby to establish communication between chamber 8 and each cell cyclically.

The central tube 2 is terminated by a drain pipe 20 having a drain-cock 21. Each cell only has one valve, but each cell may include a large number of filter elements, each mounted on its respective tubular holder member: there are then as many holes 12 as there are filter elements.

The above-described filter operates as follows:

When drain-cock 21 is closed, liquid under pressure entering through inlet 5 pressurizes admission chamber 3 after passing through screen 6 which retains the coarser impurities. Thence, it passes into cells 1a to 1h through the annular passages 12a to 12h. Having entered the cells it flows through the walls of the filter elements 11a to 11h on which it deposits its finer impurities. The filtered liquid then flows upward through the tubular holder members 10a to 10h into the exit chamber 4 and through outlet 7.

The sudden opening of a valve, say 14a, by cam 16 causes an abrupt pressure drop in cell 1a. The pressure in fact drops to a value which is less than that prevailing within the tubular holder member 10a because the annular passage 12a, acting as a gauged hole, causes between the admission chamber 3 and the cell 1a a pressure drop substantially greater than that de to the opening 13a. The difference in pressure between the inside and the outside of the wall of the filter element 11a brings about the release of the impurities deposited thereon. The unfiltered water flowing through the annular passage 12a carries these impurities away through chamber 8 and outlet 9. To avoid back-flow of filtered water from inside the filter element towards the outside thereof, the valve 14a is partly closed by cam 16 to cause the pressure within cell 1a to rise again. The filter elements are thus almost solely cleaned by unfiltered water. This filter element cleaning operation is carried out cyclically for each cell by cam 16 which causes valves 14a to 14h periodically to open. To remove from the screen 6 the coarse impurities retained thereby, it suffices to open cock 21.

Cam 16 has a contour which, when developed, has the appearance shown in FIGURE 3, and defines:

A top pass 25, corresponding to the uppermost position of a valve, such as with valve 14a in FIGURE 1, i.e. to the full opening of a passage 13;

An intermediate pass 26, corresponding to the partial opening of this passage;

A bottom pass 27, corresponding to closure of this passage.

Pass 25, when cooperating with the lower end of a valve push-rod, gives rise, as stated above, to an abrupt depression that reverses the pressure gradient through the wall of the respective filter element of a cell, which brings about the release of the impurities which have accumulated on the associated filter element. This pass is set between two steep ramps 28 and 29 and has little length so that the pressure gradient reversal is both abrupt and short, lasting only long enough to bring about this release of impurities without practically enabling any filtered liquid from back-flowing from the inside to the outside of the filter element. The pass 26 has a height such that the pressure within the filter cell will be substantially equal to that prevailing within exit chamber 3 whereby the filtered liquid will only backflow in negligible quantities so that each filter element is essentially washed only by the unfiltered liquid flowing directly from the admission chamber 3 into the chamber 8 through the annular passage or passages 12 and the passage 13 of the associated intermediate cell.

As will be appreciated from the above, the filter is cleaned automatically and continuously. Moreover, this cleaning operation takes place without having to stop the filtering action of the filter and is carried out essentially by the unfiltered liquid, the back-flow of filtered liquid being only very slight.

Figure 4:
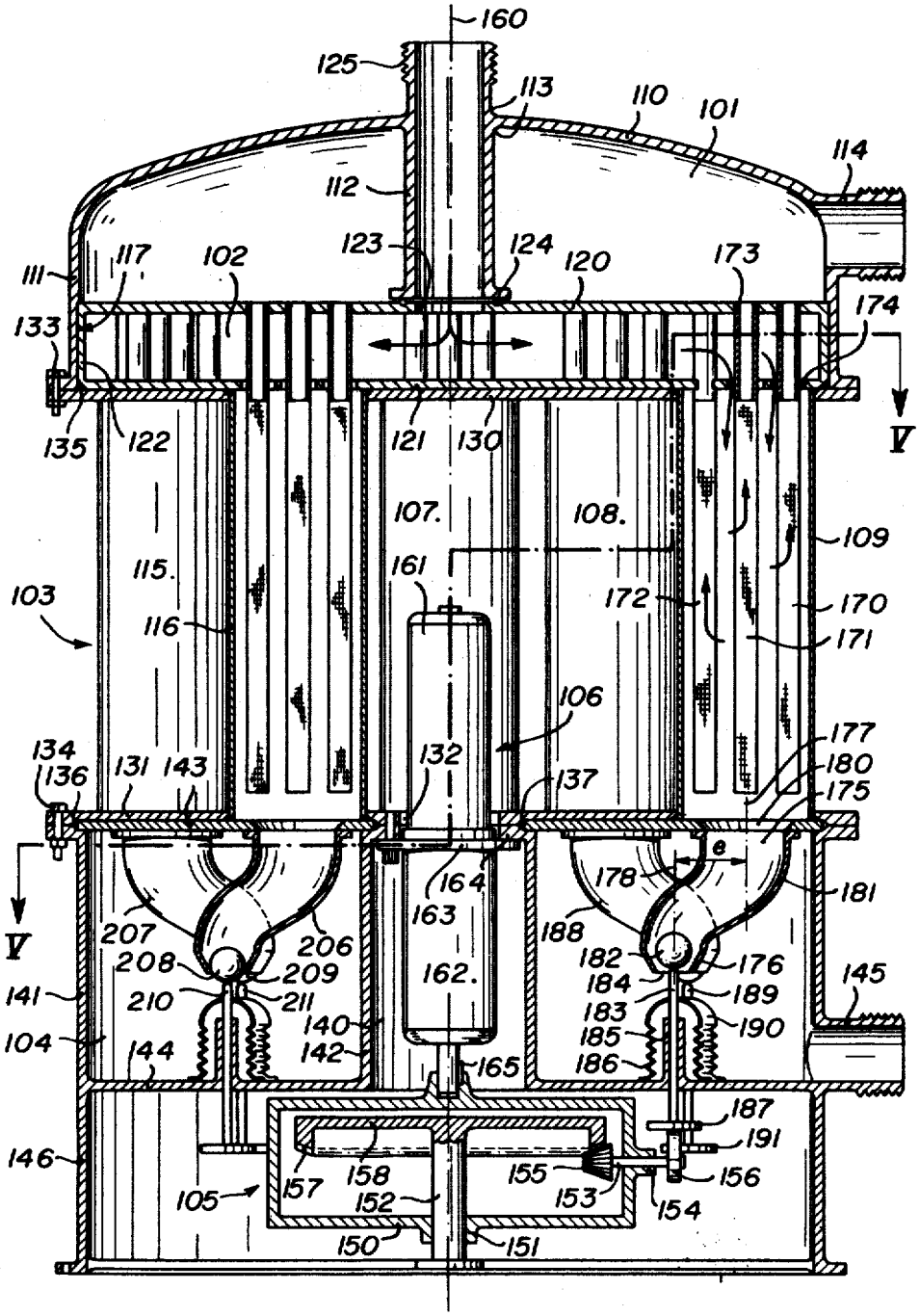
FIGURE 4 is vertical section, taken on line IV—IV of FIGURE 5, of a second embodiment of the filter according to the invention.

The filter shown in FIGURE 4 comprises an exit chamber 101, an admission chamber 102, a group 103 of filtering cells of which only five cells 107, 108, 109, 115 and 116 are visible, a discharge chamber 104, a mechanism 105 regulating the cleaning of the cells, and a drive unit 106 for driving this mechanism.

The exit chamber 101 is delimited by a cover 110 having a sidewall 111, and by the top wall 120 of the admission chamber 102. An inlet pipe 112 extends through and is fluidtightly secured to, e.g. by welding at 113, the cover 110 and connects admission chamber 102 with the exterior. An outlet 114 is secured in the upper portion of side wall 111.

The admission chamber 102, which is cylindrical in shape, is delimited by a top wall 120, a bottom wall 121 and a side wall 122. The top wall 120 is provided at its center with a hole 123 to which is connected through the intermediary of a sealing gasket 124, pipe 112 through which the admission chamber 102 is connected to an outside network. This pipe 112 is provided at the top thereof with a coupling thread 125.

The cells of group 103 are all identical and have the shape of cylindrical containers that are welded to an upper plate 130 and to a lower plate 131 to form a rigid assembly within which the cells are regularly distributed about a common axis 160 which constitutes the axis of symmetry of the filter as a whole. There is no cell at the center of the assembly and the space left free houses part of the drive unit 106, the lower plate 131 being provided with an opening 132.

The discharge chamber 104 is annularly shaped to provide a central space defining a housing 140 for the remaining part of the drive unit 106. This chamber, which is centered on axis 160, is delimited by an outer wall 141, an inner wall 142, a cover plate 143 and a bottom 144. The outer wall is provided with an outlet 145.

The mechanism 105, which will be described in greater detail further on is housed in the base of the filter, which base is formed by an extension 146 of the outer wall 141 of the discharge chamber.

The drive unit 106, which includes a motor 161 and speed reduction gearing 162, is secured in housing 140 by an outwardly turned flange 163 bolted to a shoulder 164 of the inner wall 142 of discharge chamber 104. The output shaft of reduction gearing 162 drives mechanism 105 through the intermediary of key means 165.

The mechanism 105 includes a mobile casing 150 adapted to rotate about axis 160 by virtue of a bearing 151 cooperating with a stationary post 152 secured to the base 146 of the filter. This mobile casing is rotated by the drive unit 106 through the intermediary of the key means 165. It is provided with a radial cam-carrying shaft 153 rotatably mounted in a bearing 154 and having a bevel gear 155 secured to its inner end and a cam 156 secured to its outer end. Pionion 155 meshes with a stationary bevel crown wheel 157 carried by a fixed plate 158 solid with post 152.

Exit chamber 101, admission chamber 102, the group of cells, and discharge chamber 104 are arranged sequentially along common axis 160 and are held in place by flanges clamped by nuts and bolts such as 133 and 134, admission chamber 102 being inserted in a bore 117 made for this purpose in side wall 111 of exit chamber 101. Annular sealing gaskets 135, 136 and 137 ensure fluidtightness between these various component parts and the outside as also between themselves. As for the filter cells, they are arranged around the common axis 160 in two circular rows 195 and 196 (FIGURE 5), the inner row 196 having six cells and the outer row 195 having twelve cells.

As is apparent with filter cell 109, shown in section, the latter contains a plurality of filter elements of which elements 170, 171 and 172 only are visible, the first two, 170 and 171, being shown in section. Each of these filter elements is secured to the end of a tubular holder member, as member 173 for filter element 171, which extends through the admission chamber 102 to establish communication between the interior of the filter element and the exit chamber 101. This tubular member 173 extends into the filter cell by passing through a hole formed in the bottom wall 121 of admission chamber 102, and this hole defines an annular passage 174 concentric with tube 173 and forming a gauged opening establishing communication between the admission chamber 102 and the filter cell. Each filter element is secured to an analogous holder and an annular passage, forming a gauged opening, is provided around each holder.

The cover 143 of discharge chamber 104 is provided, opposite each filter cell, with a passage opening into an elbowed channel terminated by a valve. The latter establishes or interrupts, under the action of a push-rod, communication between the associated filter cell and the discharge chamber. FIG. 4 shows in section, for cell 109, a passage 180, an elbowed channel 181 and a valve 182 actuated by a push-rod 183, and shows in elevation, for cell 108, an elbowed channel 188 and a push-rod 189. The channels are all identical to channel 181 and include an inlet 175, which is applied to passage 180 and which has a cross-section substantially equal to that of a filter cell, and a frusto-conical outlet 176. The axes 177 and 178 of inlet 175 and of outlet 176 respectively are parallel and offset thus forming within channel 181 a double bend. The value e of this offset is so chosen that by giving a suitable orientation to the elbowed channels, the push-rods may be distributed at equal angular distances along a circle centered on the common axis 160.

As regards the valves as such, they are each formed by a spherical valve body which rests, in the closure position, on a seat formed by the tapered end of the channel. This is what FIGURE 4 shows in the case of channel 181 of which the spherical valve body 182 cooperates with a seat 184 formed by the tapered end 176 of this channel. The valve body is controlled by a push-rod 183 which extends through the bottom 144 of discharge chamber 104 and through a guide 185. A bellows 186 is fluidtightly secured at one end to the bottom 144 and at the opposite end to the pushrod 183 to protect the latter and its guide 185 from the substances contained in the discharge chamber 104. The lower end of push-rod 183 carries a disk-like bearing plate 187 for cooperation with cam 156. FIGURE 4 also shows a bellows 190 secured to a push-rod 189 carrying at its free end a bearing plate 191.

The valve push-rods are distributed at equal angular distances along a circle centered on the common axis 160 so that cam 156 when made to follow the circular path imposed by rotation of the mobile casing 150 will act successively on the valve of each filtering cell. That is why the bearing plates, such as plate 187 or plate 191, each have a diameter substantially equal to the arc between the ends of two consecutive push-rods. As for the diameters of the pitch circles of crown wheel 157 and bevel gear 155, they are dimensioned so that cam 156 will carry out a full revolution about the axis of the cam-carrying shaft 153 when the mobile casing 150 rotates through an angle equal to that separating two consecutive valves.

Figure 5:
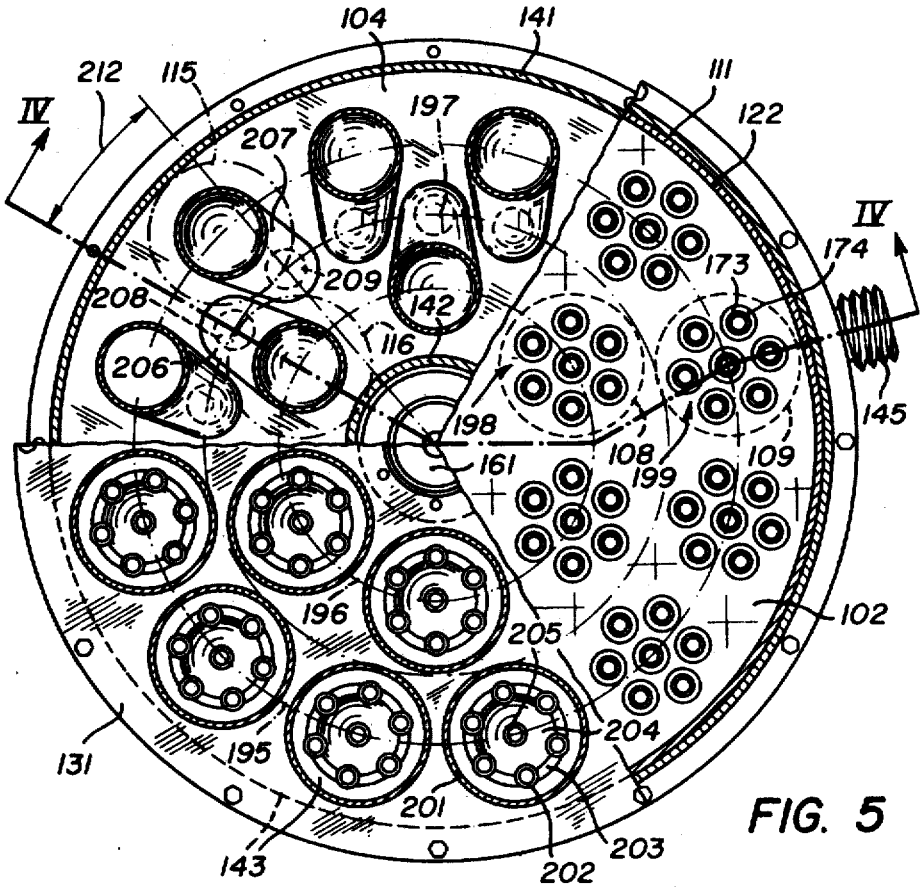
FIGURE 5 is a section taken on line V—V of FIGURE 4.

FIGURE 5 shows to the right a section through admission chamber 102, to the lower left a section through the assembly 103 of filter cells, and to the upper left a section through the upper portion of discharge chamber 104.

In the right-hand part of FIGURE 5, the tubular holder members, which are identical to holder 173, are shown in groups of seven, each group being associated with one cell. Thus, group 198 is associated with cell 108 and group 199 is associated with cell 109, the outline of these cells being shown in chain lines, as if they were seen in transparency through the bottom wall 121 of admission chamber 102. Around each tubular holder member is formed an annular passage similar to annular passage 174 surrounding tube 173. Each group of tubular holder members and annular passages bring the associated cell into communication with, on the one hand, exit chamber 101, via the tubular holder members, and with, on the other hand, the admission chamber 102, via the annular passages. Thus, group 199 brings cell 109 into communication with exit chamber 101 via the tubular holder members, such as holder 173, and with admission chamber 102 via the annular passages, such as passage 174.

In the lower left-hand part of FIGURE 5, which shows a number of filter cells in section, are seen within cell 201, which is similar to cell 109, the seven filter elements associated therewith, notably element 202, which is similar to element 170 carried by holder 173. At the bottom of cell 201 is seen passage 203, similar to passage 180 (FIGURE 4), which opens into channel 204, similar to channel 181, over which lies the central filter element 205, which is similar to the central filter element 171 (FIGURE 4).

These two sections show how the filter cells are distributed in two circular rows, i.e. an outer row 195 and an inner row 196, both shown in chain-dotted lines, and how these rows are disposed in relation to one another so that the dead space lying between the cells may be reduced to a minimum.

In the upper left-hand part of FIGURE 5, which is a section passing through the upper portion of discharge chamber 104, are to be seen the channels which connect the discharge chamber to each of the filter cells. Thus, channel 206 connects discharge chamber 104 to filter cell 116, which is visible in FIGURE 4, whereas only its projected outline is shown in chain-dotted lines in FIGURE 5. The section passes through the upper portion of channel 206 so that the associated valve 208 is not visible, hence the fact that it is only shown in broken lines, as if it could be perceived through channel 206. The channels associated with the cells of the inner row 196 are directed outwardly and those associated with the cells of the outer row 195 are directed inwardly so that all of the valves, e.g. 208 and 209, may be located on a circle 197 centered on the common axis 160. The channels are so dimensioned and oriented that the center of the valves, in other words the associated push-rods, such as rods 183, 189, 210 and 211 (FIGURE 4) may be uniformly distributed along this circle, the angular distances 212 between successive centers being equal.

Figure 6:
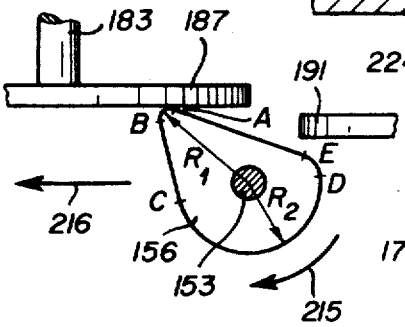
FIGURE 6 is a side view on an enlarged scale of a component part of the filter shown in FIGURE 4.

Cam 156 is contoured to define two passes as shown in FIGURE 6: a "raised" pass AB, having a radius $R_1$ and a short length, which corresponds to the fully open position of the valve, and an "intermediate" pass CD, having a radius $R_2$ and a relatively long length, which corresponds to the partly open position of the valve.

These two passes are connected to one another by ramps BC and EA and by a rounded portion DE.

The fixed plate 158 (FIGURE 4) carrying crown-wheel 157 is located on the same side of the cam-carrying shaft 153 as the bearing plates, such as plate 187, secured to the valve push-rods. Thus, cam rotation, represented by arrow 215 (FIGURE 6), will impart to the point of contact between cam 156 and the bearing plates a tangential velocity that is oppositely directed to the velocity, represented by arrow 216, that is imparted by the circular translation due to rotation of the mobile casing 150; in the case of FIGURE 4, the fixed plate 158 is located above the mobile shaft 153, as with bearing plates 187 and 191. Thus, cam 158 rolls as it were on the bearing plates and its sliding motion in relation to the latter is reduced to a minimum, thereby reducing wear.

This second filter operates as follows:

Reference will be made to filter cell 109 (FIGURE 4) and it will be assumed that valve 182 is positioned in the closure stage of its cycle, so that channel 181 is closed. Under these conditions, the liquid charged with impurities flows through inlet pipe 112 into admission chamber 102 wherefrom it enters into filter cell 109 through the gauged annular passages corresponding to annular passage 174. Channel 181 being closed, the liquid can only escape by entering radially inwardly into the filter elements, such as elements 170, 171 and 172. The liquid deposits its impurities on the outer surface thereof, in the form of a cake, and the filtered liquid, which rises through the tubular holder members similar to holder 173, passes into exit chamber 102 wherefrom it flows out through exit 114. The path of the liquid is thus as shown by the several arrows in FIGURE 4. At the instant when the "raised" pass of cam 156 pushes bearing plate 187, valve 182 becomes fully open, thereby causing an abrupt pressure drop in filter cell 109. The dimensions of the annular passages and of the seat 184 of valve 182 are chosen so that the pressure gradient through the walls of the filtering plugs will reverse during this opening stage, and the cake is caused to loosen and to be carried away towards the discharge chamber 104, through channel 181 and valve 182. During this phase, the unfiltered liquid no longer flows into the filter elements, but flows towards the discharge chamber along the filter elements while washing the outer surfaces thereof. This washing action by the unfiltered liquid goes on during the partial opening stage of the valve working cycle and only comes to an end when valve 182 closes again. The radius $R_2$ of the "intermediate" pass CD of cam 156 (FIGURE 6) is so chosen that the partial opening of valve 182 will impart to the pressure within the filter cell a value substantially equal to that prevailing within the exit chamber 101; the pressure gradient through the walls of the fiber elements is then practically nil, so that only a small part of the filtered liquid will back-flow.

During its circular translation around the common axis 160, cam 156 successively operates each valve; only one cell will be subjected to this washing operation at a time and this operation is cyclically repeated for all of the cells. The filter is thus self-cleaning and its complete cleaning is thus practically carried out by the unfiltered liquid alone, the loss of filtered liquid being very small (to the extent of a few percent). As the filter is multicellular, the successive and cyclical nature of the cleaning operation of each cell thus causes the filtering action of the filter as a whole never to be interrupted by the cleaning operation: the filter consequently ensures uninterrupted filtration. Moreover, the arrangement of having concentric rows of angularly offset cells makes it possible to have a very large filtering area for a relatively small volume, thus enabling large throughputs of liquid to be achieved with a compact filter.

Finally, the fact that the filter elements, the cells and the curved channels are, respectively, identical components, it is possible, by assembly of standard parts, readily to produce filters adapted, as regards their performance, to the various specific cases of utilization.

This second filter can be modified in various, ways and some of these modifications will be enumerated.

It is possible to provide several cams similar to cam 156 (FIGURE 4), each being rigidly mounted on its own-carrying shaft provided with a bevel gear meshing with the crown-wheel 157, which cams are distributed all around the mobile casing 150. In this case, several cells are simultaneously subjected to a cleaning operation and each cell is subjected to several cleaning operations during each revolution of casing 150, this being possibly made necessary when the liquid to be filtered contains a lot of impurities. In such a case, caking can occur in fact so quickly that it becomes necessary to increase the rate of the cleaning operations. This of course brings about a decrease of the filtered liquid output in a filter of corresponding size.

It will be appreciated that the mobile casing 150 is but one example of the manner in which the cam-carrying shaft may be circularly translated about the fixed post 152. One skilled in the art will readily be able to devise numerous ways of producing means having the same effect as the mobile support.

Figure 7:
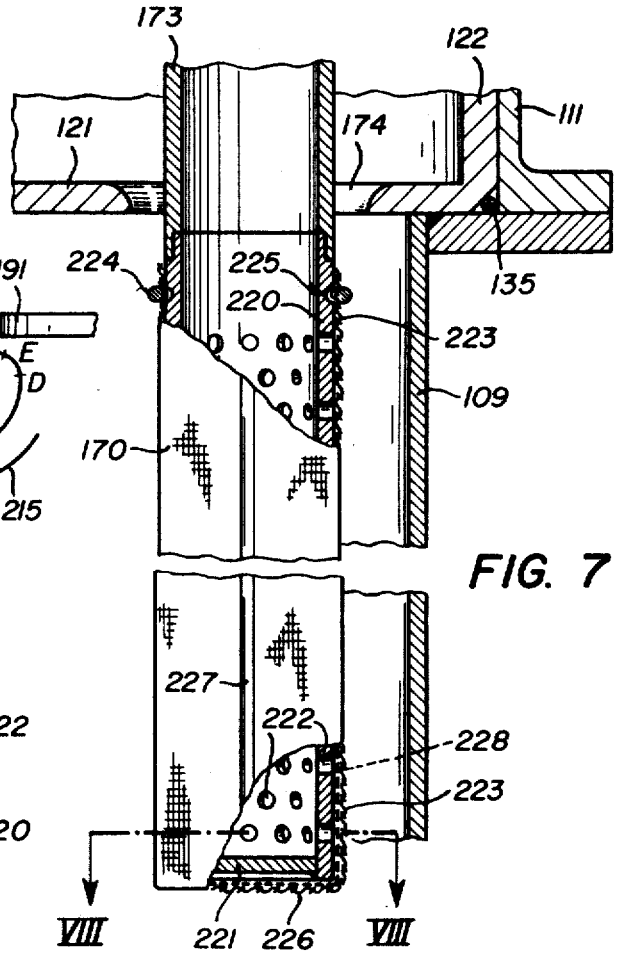
FIGURES 7 and 8 illustrate, on an enlarged scale, part of a modified form of filter element for the filters shown in FIGURES 1 and 4, FIGURE 7 being a partial section and FIGURE 8 being a cross-section taken on line VIII—VIII of FIGURE 7.
Figure 8:
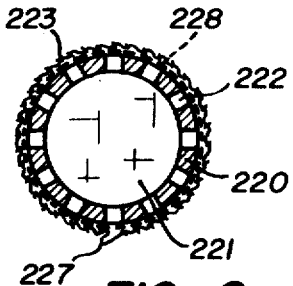

The filter elements may, in order to facilitate the break-up of the cake, be made as shown in FIGURES 7 and 8. In this particular form of construction, the filter elements each comprises a tubular supporting body 220 that is secured by its upper end, as for example by screwing, to holder 173, and that is closed off at its opposite end by a bottom 221. The body 220 is formed with numerous holes 222 having a diameter of a few millimeters. Over this body is slipped a deformable sheath 223 having a multitude of minute interstices, the size of the latter being adapted to the size of the impurities to be held back. This sheath can, for example, be made of a woven material which has a mesh size selected depending on the size of the impurities, and which is secured to the supporting body by an elastic ring 224 which clips it to the bottom of a circular groove 225. The sheath 223 is provided with a bottom 226 and has a diameter slightly larger (to the extent of a few millimeters) than that of the supporting body 220, so that, when applied to the latter by the pressure of the liquid flowing therethrough from the outside to the inside during the closure stage of the working cycle of valve 182 (FIGURE 4) it forms one or more longitudinal folds, similar to fold 227 extension along a generatrix.

At the instant when the pressure gradient through the sheath reverses during the stage when valve 182 is fully opened, the folds, such as 227, smooth out and the sheath blows out to shatter the cake formed on its outer face. This arrangement thus facilitates the break-up of the cake.

To prevent the deformable sheath 223, particularly if it is made of very fine textile material, from being subjected to too great a strain, opposite holes 222, by the pressure gradient set up by the flowing liquid, and from tearing, it is advantageous to provide, between the supporting body 220 and the sheath 223 an intermediate, relatively rigid, support 228 having larger meshes than those of the textile material but smaller than the holes 222, as for example woven wire netting. This intermediate support 228 is adjusted on the supporting body and secured thereto by the elastic ring 224 which clamps it, together with the deformable sheath 223.

Figure 9:
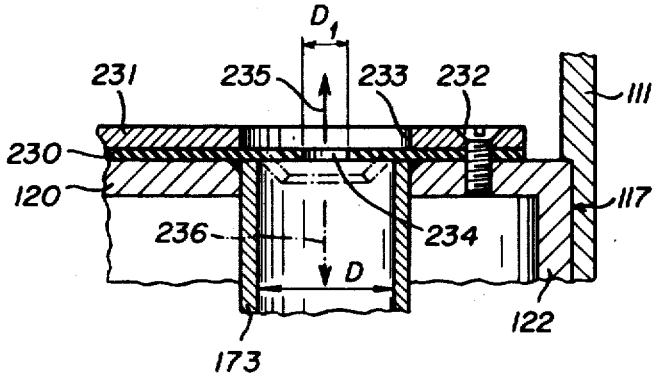
FIGURE 9 illustrates in section, on an enlarged scale, a modified constructional detail for the filters shown in FIGURES 1 and 4.

It is advantageous to provide each tubular holder member, where it opens into exit chamber 101, with an apertured elastic diaphragm having the property, by virtue of its elasticity, to provide an orifice of larger cross-section when the liquid flows at great speed as compared to when the liquid flows at low speed. This is shown in FIGURE 9. The topside of wall 120 between admission chamber 102 and exit chamber 101 is covered with a sheet 230 of elastic material pressed against wall 120 by a clamping plate 231 held down on wall 120 by screws 232. This clamping plate 231 is formed with a hole opposite each tubular holder member, such as hole 233 opposite holder 173. Sheet 230 is itself formed with holes 234, having a diameter $D_1$ smaller than the diameter D of the tubular holder members. When the filter cells are operative, the liquid flows in the direction of arrow 235 but at relatively low speed. At the instant when the pressure gradient through the wall of filter elements reverses, at the beginning of a cell cleaning operation, there occurs a brief back-flow in the direction of arrow 236, which back-flow is large during the time that is necessary to shatter the cake formed on the filter elements in the cell being cleaned. The elastic sheet bulges downwardly to assume the shape shown in chain-dotted lines and the diameter of hole 234 becomes larger. Thus, at the instant valve 182 is fully opened (FIGURE 4) the back-flow is largest and, as soon as the valve comes to its partly open position, this back-flow rapidly decreases since the diameter of hole 234 (FIGURE 9) resumes its initial valve $D_1$.

It will of course be appreciated that the number of filter elements comprised by a filter cell, seven in the above-described embodiment, is arbitrary.

Figure 11:
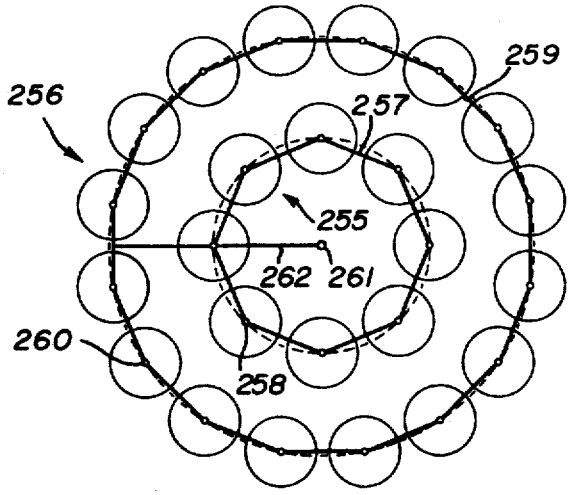
FIGURE 11 shows the geometric lay-out of the filter cells in a filter, such as that shown in FIGURE 4, having two concentric rows of filter cells.

The above-described filter embodiment comprises eighteen filter cells but these can be more numerous. They are arranged in two circular rows, an inner row and an outer row, the latter having twice as many cells as the inner row. They are moreover arranged so that the traces of their axes on a plane perpendicular to the common axis describe two regular polygons which have equal sides and which are both centered on the common axis, the outer polygon having twice as many sides as the inner polygon. This is shown in FIGURE 11 which is concerned with an embodiment having twenty-four cells, the inner row 255 comprising eight cells and the outer row 256 comprising sixteen cells. The polygon 257 having as apexes the traces, such as 258, of the axes of the cells of the inner row 255, has sides equal to the sides of polygon 259 having as apexes the traces, such as 260, of the axes of the cells of the outer row 256. These two polygons are centered on the common axis 261 and their orientation is such that the radii of the inner polygon coincide with the apothems of the outer polygon. Thus, radius 262 of polygon 257 coincides with an apothem of polygon 259.

The above-described filters, as also the modified constructional forms thereof, may operate alone or in the presence of filtering adjuvants. When the devices are intended to operate in conjunction with a filtering adjuvant, it is useful to adopt a method of operation that will save in the consumption of the latter.

Figure 10:
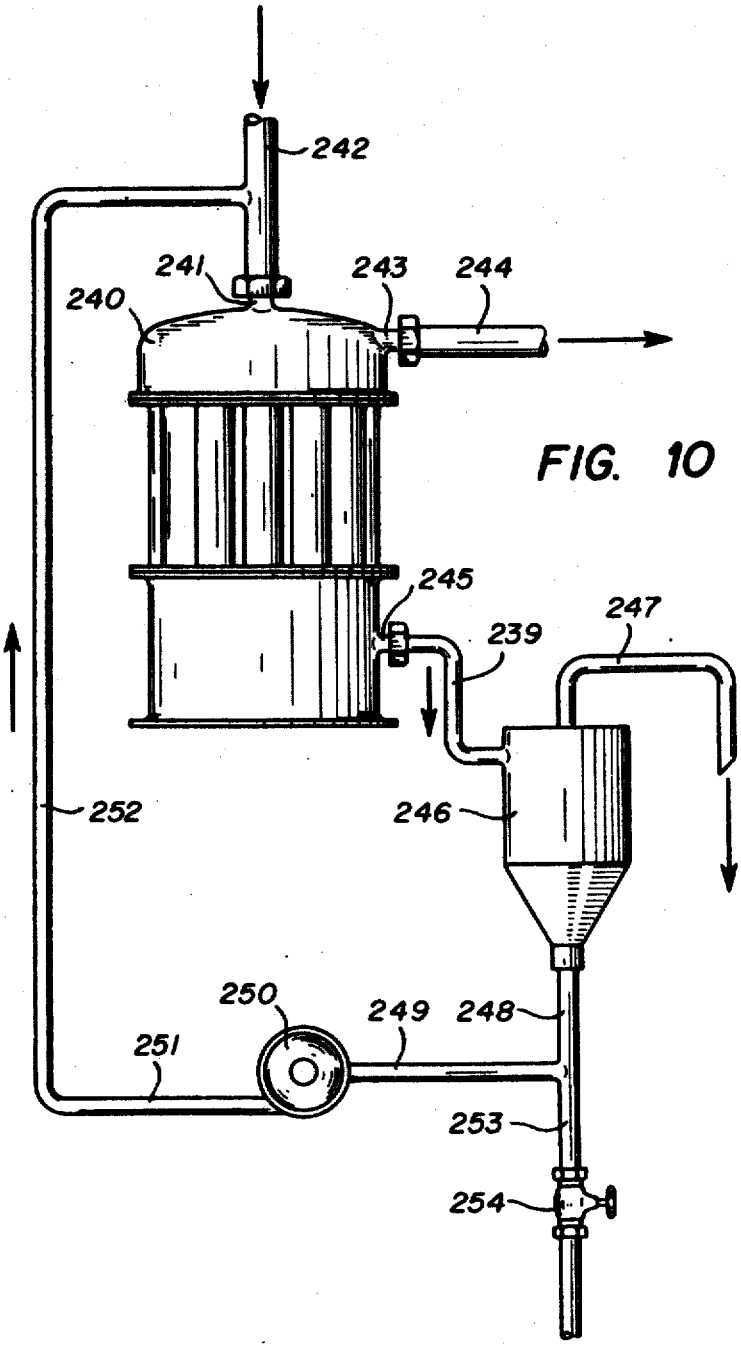
FIGURE 10 illustrates a method of operating the filters shown in FIGURES 1 and 4.

This method of operation, which constitutes a second aspect of the invention, is diagrammatically outlined by way of example in FIGURE 10. In this figure is to be seen a filter 240 similar to the filter shown in FIGURE 4, connected by its inlet pipe 241 to piping 242 conveying the unfiltered liquid, and connected by its outlet pipe 243 to piping 244 conveying the filtered liquid. The discharge outlet 245 is connected by a discharge pipe 239 to a separator 246 adapted to separate the liquid collected in the discharge chamber into a fraction containing the impurities and a fraction containing the filtering adjuvant. This separator operates on the basis of the highly differing masses possessed by the impurity particles and by the filtering adjuvant particles: it could for example consist of a cyclonic separator. It has two outlets 247 and 248 for respectively conveying the impurity charged fraction and the filtering adjuvant charged fraction. Outlet 248 is connected by a pipe 249 to the inlet of a pump 250 of which the outlet 251 is connected by way of a pipe 252 with piping 242. The separator outlet 247 discharges outside, whereas a pipe 253 having a cock 254 enables the filtering adjuvant charged fraction to be discharged outside also if need be instead of being recirculated.

This method of operation thus consists in separating, by means of the separator 246, the impurities from the filtering adjuvant and in reinjecting the latter by means of pump 250 into the unfiltered liquid. The filtering adjuvant is thus caused to follow a closed circuit passing through the filter 240, and the adjuvant is continuously recirculated with the help of separator 246. This method of operation is particularly economical as regards consumption of filtering adjuvant and enables continuous clogging filtration by means of a filtering adjuvant.

What is claimed is:

1. A continuously and automatically cleaning multicellular mechanical filter for liquids under pressure comprising, sequentially, an exit chamber, an admission chamber and a plurality of filter cells distributed about a common axis, the exit chamber, which is common to all filter cells, communicating with each filter cell via at least one tubular holder member having secured to the end thereof a filter element, and the admission chamber, which is common to all filter cells, communicating with each filter cell via a gauged annular passage provided around each tubular holder member, and further comprising after said plurality of filter cells a discharge chamber communicating with each filter cell via a channel provided with a valve, and means for successively subjecting each valve to a three-stage working cycle consisting of a maximum opening stage of very short duration, a partial opening stage of longer duration and a closure stage lasting for the remainder of said cycle, the passage through each valve having a cross-section such that the pressure gradient through each filter element, during said maximum opening stage, is the reverse of the pressure gradient during said closure stage and such that said pressure gradient is nil during said partial opening stage.

2. A filter according to claim 1, wherein each valve has a push-rod acting in a direction parallel to said common axis, the free end of each push-rod being positioned, in the closure position of the associated valve, on a common pitch circle centered on said common axis, said means which subjects the valves to a three stage operation comprising an axially acting cam centered on said common axis and rotatably driven about the latter whereby the contour of said cam will successively cooperate with the free end of each push-rod, said contour including an upper pass corresponding to said maximal opening stage, an intermediate pass corresponding to said partial opening stage, and a lower pass corresponding to said closure stage, and said contour being such that at each instant only a minority of said valves will be in the course of the maximal opening and partial opening stages of their working cycle.

3. A filter according to claim 1, wherein the filter cells consist of identical cylindrical containers having their axes parallel to said common axis, said cells forming two concentric circular rows centered on said common axis, the outer row having twice as many cells as the inner row, wherein the two polygons outlined on a plane perpendicular to said common axis by the traces of the axes of the cells of each said rows are regular polygons having equal sides and being angularly oriented in relation to one another so that the radii of inner row polygon may be the apothems of the outer row polygon, and wherein said channels are identical for all of said cells, each channel having an inlet with a cross-section substantially equal to that of a cell and a frusto-conical outlet providing the seat of the valve associated therewith, and forming a double bend whereby the inlet and the outlet are offset with respect to one another with their axes in parallel relationship, said valve having a push-rod in alignment with the outlet axis.

4. A filter according to claim 3, wherein the extent to which the channel inlet and outlet axes and the orientation of each of said channels are such that the traces of said channel outlet axes on a plane perpendicular to said common axis are distributed at equal intervals along a circle centered on said common axis, the radius of said circle having a value intermediate the values of the radii of the circles circumscribing said polygons.

5. A filter according to claim 4, wherein said means which subjects the valves to a three stage operation comprises a cam-carrying shaft perpendicular to said common axis and having secured thereon a radially acting cam and a pinion, a fixed crown-wheel centered on said common axis and meshing with said pinion, and a mobile support carrying said cam-carrying shaft and rotatably drivable by driven means, whereby rotation of said mobile support will cause circular translation of said cam and rotation thereof about the axis of the cam-carrying shaft at the rate of one revolution of the cam for an angular displacement of the mobile support equal to the angle between two consecutive valves, said cam having a first pass corresponding to the maximal opening stage of the working cycle of a valve and a second pass corresponding to the partial opening stage of said working cycle, the free end of each push-rod having a bearing plate secured thereto to enable said cam to act on each push-rod despite said circular translation, and said fixed crown-wheel being located to the same side of said cam-carrying shaft as the push-rod bearing plates whereby said cam may "roll" on said bearing plates.

6. A device according to claim 1, wherein each tubular holder member connecting the interior of the associated filter element with said exit chamber is partly closed off at its outlet by an apertured membrane of elastic material.

7. A filter according to claim 1 comprising separator means having an input connected to the output of said discharge chamber for receiving liquid therefrom containing filtering adjuvant and impurities, said separator means being operative to separate said liquid received from the discharge chamber into two fractions, the first of which is said filtering adjuvant and the second of which is said impurities, discharge means from said separator means for said second fraction, an inlet pipe for the supply to said admission chamber of liquid to be filtered and means for conveying said first fraction from the separator means to said inlet pipe upstream of the admission chamber.

*8. Automatic cleaning filter apparatus for liquids under pressure comprising means defining an admission chamber for receiving raw liquid to be filtered, means for delivering raw liquid to the admission chamber, means defining an outlet chamber for receiving the filtrate, means for conducting filtrate out of the outlet chamber, at least one filter cell operatively interposed between and communicating with the admission chamber and the outlet chamber, each filter cell including at least one tubular holder member, with each holder member communicating at one end with the outlet chamber and carrying a filter element, each filter cell communicating with the admission chamber through means defining a gauged annular passage surrounding each tubular holder member for restricting the rate of inflow of raw liquid, means defining a cleaning outlet in communication with each filter cell, a valve in each cleaning outlet, and means for successively operating the valve to provide a three-stage working cycle consisting of (1) a maximum opening stage of short duration, (2) a partial opening stage of longer duration than the maximum opening stage, and (3) a closed stage for normal filtering, the valve passage having a cross section, relative to the cross section of the gauged annular passage between the admission chamber and each filter cell, during the maximum opening stage such that the pressure gradient across each filter element is reversed from that existing during the closed stage, thereby to establish a back flow of filtrate through each filter element to break away the filter cake formed on each element, and during the partial opening stage such that the pressure gradient across each filter element is substantially nil, thereby to establish an outflow from each filter cell through the cleaning outlet at a rate to afford flushing o) raw liquid and filter cake without substantial backflow of filtrate.*

*9. Apparatus according to claim 8 wherein the cleaning outlet is located remote from each gauged annular opening relative to the corresponding filter element whereby raw liquid sweeps each filter element during the partial opening stage of a cleaning cycle.*

*10. Apparatus according to claim 9 wherein the cleaning outlet communicates with each cell in a position generally opposite one end of each filter element, and the gauged annular passage is adjacent the other end of each filter element, whereby liquid sweeps each filter element during the flushing stage of a cleaning cycle.*

*11. A filter according to claim 8 wherein the valve in each cleaning outlet includes a member shiftable along an axis, and the means for operating the valve includes an actuator coupled to the valve member and cam means engageable with the actuator to shift the member generally axially between positions providing the said three stages.*

*12. Automatic cleaning filter apparatus for liquids under pressure comprising a vessel, means subdividing the vessel into a multiplicity of sections, means defining an admission chamber for receiving raw liquid to be filtered, means for delivering raw liquid to the admission chamber, means defining an outlet chamber for receiving the filtrate, means for conducting filtrate out of the outlet chamber, a filter cell in each section operatively interposed between and communicating with the admission chamber and the outlet chamber, each filter cell including at least one tubular holder member, with each holder member communicating at one end with the outlet chamber and carrying a filter element, each filter cell communicating with the admission chamber through means defining a gauged annular passage surrounding each tubular holder member for restricting the rate of inflow of row liquid, means defining a cleaning outlet in communication with each filter cell, a valve in each cleaning outlet, and means for successively operating each valve to provide a three-stage working cycle consisting of (1) a maximum opening stage of short duration, (2) a partial opening stage of longer duration than the maximum opening stage, and (3) a closed stage for normal filtrate, the valve passage having a cross section, relative to the cross section of the gauged annular passage between the admission chamber and each filter cell, during the maximum opening stage such that the pressure gradient across each filter element is reversed from that existing during the closed stage, thereby to establish a back flow of filtrate through each filter element to break away the filter cake formed on each element, and during the partial opening stage such that the pressure gradient across each filter element is substantially nil, thereby to establish an outflow from each filter cell through the cleaning outlet at a rate to afford flushing of raw liquid and filter cake without substantial backflow of filtrate.*

*13. Apparatus according to claim 12 wherein the cleaning outlet for each cell is located remote from each gauged annular opening relative to the corresponding filter element whereby raw liquid sweeps each filter element during the partial opening stage of a cleaning cycle.*

*14. Apparatus according to claim 12 wherein the valve for the cleaning outlet of each cell includes a member shiftable along an axis, and wherein the means for operating each valve includes an actuator coupled to each member and cam means engageable with each actuator to shift the member generally axially between positions providing the said three stages.*

*15. Apparatus according to claim 14 wherein the cam means includes a cam member common to at least two of the valve actuators and means for shifting the said cam member sequentially from one to the other of the said at least two actuators.*

*16. Automatic cleaning filter apparatus for liquids under pressure comprising means defining an admission chamber for receiving raw liquid to be filtered, means for delivering raw liquid to the admission chamber, means defining an outlet chamber for receiving the filtrate, means for conducting filtrate out of the outlet chamber, a least one filter cell operatively interposed between and communicating with the admission chamber and the outlet chamber, each filter cell including at least one tubular holder member, with each holder member communicating at one end with the outlet chamber and carrying a filter element, each filter cell communicating with the admission chamber through means defining a gauged annular passage surrounding each tubular holder member for restricting the rate of inflow of raw liquid, means defining a cleaning outlet in communication with each filter cell, a valve in each cleaning outlet, means for successively operating the valve to provide a three-stage working cycle consisting of (1) a maximum opening stage of short duration, (2) a partial opening stage of longer duration than the maximum opening stage, and (3) a closed stage for normal filtering, the valve passage having a cross section, relative to the cross section of the gauged annular passage between the admission chamber and each filter cell, during the maximum opening stage such that the pressure gradient across each filter element is reversed from that existing during the closed stage, thereby to establish a back flow of filtrate through each filter element to break away the filter cake formed on each element, and during the partial opening stage such that the pressure gradient across each filter element is substantially nil, thereby to establish an outflow from each filter cell through the cleaning outlet at a rate to afford flushing of raw liquid and filter cake without substantial backflow of filtrate, and separator means having an inlet adapted to be communicated with the cleaning outlet of each cell to receive a mixture of raw liquid, impurities and adjuvant from the cell upon cleaning of each filter element, the separator means being operative to separate the mixture into a fraction containing the adjuvant and a fraction containing the impurities and to deliver the adjuvtant fraction to a first discharge*

*conduit and the impurities fraction to a second discharge conduit, and means for communicating the first discharge conduit with the admission chamber to recycle adjuvant back to each filter element.*

*17. Automatic cleaning filter apparatus for liquids under pressure comprising a vessel, means subdividing the vessel into a multiplicity of sections, means defining an admission chamber for receiving raw liquid to be filtered, means for delivering raw liquid to the admission chamber, means defining an outlet chamber for receiving the filtrate, means for conducting filtrate out of the outlet chamber, a filter cell in each section operatively interposed between and communicating with the admission chamber and the outlet chamber, each filter cell including at least one tubular holder member, with each holder member communicating at one end with the outlet chamber and carrying a filter element, each filter cell communicating with the admission chamber through means defining a gauged annular passage surrounding each tubular holder member for restricting the rate of inflow of raw liquid, means defining a cleaning outlet in communication with each filter cell, a valve in each cleaning outlet, means for successively operating each valve to provide a three-stage working cycle consisting of (1) a maximum opening stage of short duration, (2) a partial opening stage of longer duration than the maximum opening stage, and (3) a closed stage for normal filtering, the valve passage having a cross section, relative to the cross section of the gauged annular passage between the admission chamber and each filter cell, during the maximum opening stage such that the pressure gradient across each filter element is reversed from that existing during the closed stage, thereby to establish a back flow of filtrate through each filter element to break away the filter cake formed on each element, and during the partial opening stage such that the pressure gradient across each filter element is substantially nil, thereby to establish an outflow from*

*each filter cell through the cleaning outlet at a rate to afford flushing of raw liquid and filter cake without substantial backflow of filtrate, and separator means having an inlet adapted to be communicated with the cleaning outlet of each cell of the vessel to receive a mixture of liquid, impurities and adjuvant from the cells of the several sections upon cleaning them, the separating means being operative to separate the mixture into a fraction containing the adjuvant and a fraction containing the impurities and to deliver the adjuvant fraction to a first discharge conduit and the impurities fraction to a second discharge conduit and means for communicating the first discharge conduit with the admission chamber and thereby recycle adjuvant back to the filter elements.*

References Cited

The following references, cited by the Examiner, are of record in the patented file of this patent or the original patent.

UNITED STATES PATENTS

| | | | |
|---|---|---|---|
| 582,403 | 5/1897 | Stifel | 210—106X |
| 1,993,175 | 3/1935 | Libbey et al. | 210—333X |
| 2,035,592 | 3/1936 | Christensen | 210—333X |
| 2,055,869 | 9/1936 | Manning | 210—75 |
| 2,347,927 | 5/1944 | Paterson et al. | 210—108UX |
| 2,682,812 | 7/1954 | Mathewson | 210—393X |
| 2,784,846 | 3/1957 | Olson et al. | 210—333 |
| 2,828,017 | 3/1958 | Ronningen et al. | 210—142X |
| 3,280,980 | 10/1966 | King | 210—108 |
| 3,283,903 | 11/1966 | Muller | 210—108 |
| 2,703,748 | 3/1955 | Clark et al. | 210—202X |

JOHN ADEE, Primary Examiner

U.S. Cl. X.R.

210—193, 195, 333

PO-1050
(5/69)

UNITED STATES PATENT OFFICE
CERTIFICATE OF CORRECTION

Patent No. RE 27,163 Dated August 10, 1971

Inventor(s) JEAN-JACQUES ASPER

It is certified that error appears in the above-identified patent and that said Letters Patent are hereby corrected as shown below:

Column 2, line 43, "fromed" should be --formed--; Column 3, line 5, "de" should be --due--; Column 7, line 13, "fiber" should be --filter--; Column 8, line 55, "valve" should be --value--; Column 11, line 73, "row liquid" should be --raw liquid--; Column 12, line 4, "filtrate" should be --filtering--; line 40, "a least" should be --at least--.

Signed and sealed this 13th day of June 1972.

(SEAL)
Attest:

EDWARD M.FLETCHER,JR.
Attesting Officer

ROBERT GOTTSCHALK
Commissioner of Patents